(No Model.)

A. BÜHLER.
MUCILAGE HOLDER.

No. 565,328. Patented Aug. 4, 1896.

WITNESSES:
E. Wolff
Chas. E. Poensgen.

INVENTOR:
Adolph Bühler.
BY
Haupt & Haupt
ATTORNEYS.

UNITED STATES PATENT OFFICE.

ADOLPH BÜHLER, OF REICHENHALL, GERMANY.

MUCILAGE-HOLDER.

SPECIFICATION forming part of Letters Patent No. 565,328, dated August 4, 1896.

Application filed March 19, 1896. Serial No. 583,929. (No model.)

*To all whom it may concern:*

Be it known that I, ADOLPH BÜHLER, a subject of the King of Bavaria, residing at Reichenhall, in the Kingdom of Bavaria and Empire of Germany, have invented new and useful Improvements in Holders for Mucilage and other Substances, of which the following is a specification.

This invention relates to an improvement in receptacles for adhesives and other substances—as, for example, colors or other liquids with which a brush or spreader is used; and the object of the invention is to facilitate the use and to secure cleanliness of the receptacle and of the brush or spreader, as well as to secure protection from evaporation and dust, as set forth in the following specification and claims and illustrated in the annexed drawings, in which—

Figure 1:
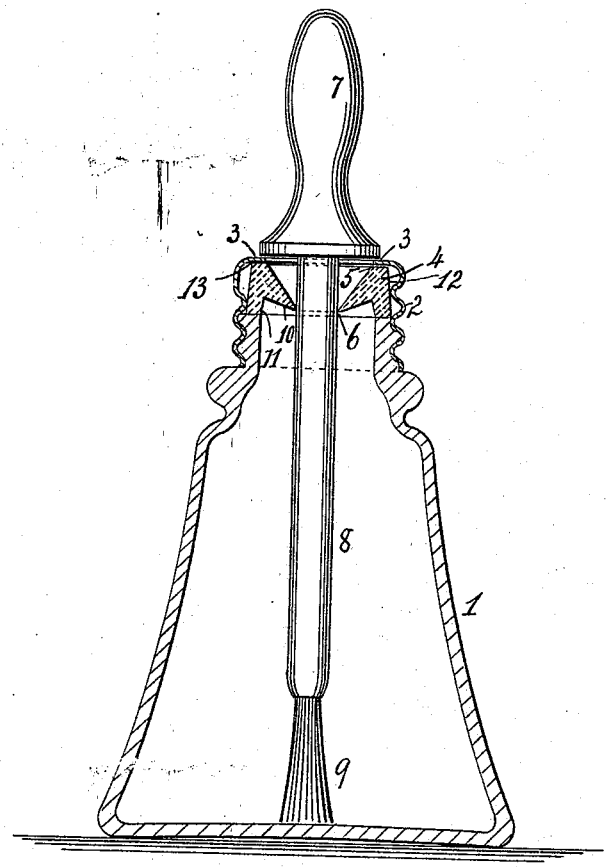
Figure 2:
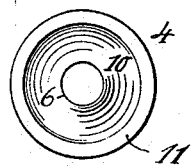
Figure 3:
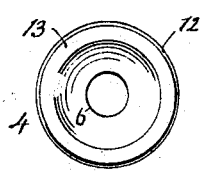

Figure 1 is an elevation of a receptacle. Fig. 2 is an inverted plan view of a washer or scraper. Fig. 3 is a plan view of a washer or scraper.

The receptacle or bottle 1 has secured or screwed thereto a cap or holder 2, the flange or part 3 of which engages or holds a washer 4. This washer of flexible material, as rubber, has an orifice or opening 5 6 of funnel shape. This tapering or funnel shape of the opening 5 6 is so continued through said washer as to cause a thin or knife edge to be formed at the narrowest part 6 of said opening.

The handle 7 has a stem 8 and a brush or applying part 9 by which the contents of receptacle 1 can be suitably spread or applied for use. The stem 8 and the opening part 6 being fitted or made to correspond in shape, the brush or spreader when in place will by said stem properly close or plug the receptacle or cause the contents to be protected.

The washer 4 being flexible or elastic not only secures an almost air-tight closure about stem 8 when in place or inserted, but also prevents clogging or adhering, as the meeting edge 6 is too thin or knife-like to enable adhesive to get any material degree of hold, in addition to which the flexibility of the washer enables the stem 8 when moved to readily slide or detach itself in case it should adhere to the washer.

The proper insertion of the handle or spreader into the receptacle is aided or facilitated by the flexible funnel or tapering opening 5 6 readily guiding the brush or spreader while being inserted. On withdrawing the handle or spreader from the receptacle the washer 4 acts as a stripper or scraper, the snugly-fitting edge 6 taking surplus material off the stem 8 and part 9, leaving the spreader in hand ready for use without loss of time or material and without danger of uncleanliness by dripping.

The washer or stripper 4 has a portion 10 of its face about the narrowest part of the opening sunk or receded and inclined from the circumference downward toward said opening, so that any material adhering to face 10 will not pass to or soil the mouth part of the receptacle, but will flow or pass away from the circumference of the washer and toward the opening, so as to drop or pass thence back into the receptacle. The flange or ring-shaped seat 11, formed by said depressed or sunken face 10, enables the washer or scraper 4 to sit or close tightly onto the mouth portion of the receptacle.

The outer side 12 of the washer or stopper 4, if made inclined or tapered, enables the cap 2 to be readily set into place over the washer, and the washer is provided at its top with a flat rim or face 13, onto which the flange 3 of the cap can sit to hold the washer in place.

Of course the washer or scraper need not be held in place, as shown, by a cap 2, since other means of securing the washer may be suitable.

The invention is not confined to the exact construction shown, as modifications thereof may be made which will be within the scope of the invention. For example, the washer 4, instead of sitting on the receptacle, might be inserted or partly inserted therein. All such modifications are included in my invention.

What I claim as new, and desire to secure by Letters Patent, is—

1. The combination of a receptacle with a flexible washer or stopper having a funnel-shaped opening, and a handle or stem provided with a brush or spreader, said handle or stem and the narrowest part of the opening of said washer being fitted to one another substantially as described.

2. The combination of a receptacle with a flexible washer or stopper having an opening formed tapering or funnel-shaped through said washer so as to form a thin or knife-edge at the narrowest part of said opening, and a handle or stem provided with a brush or spreader, said handle or stem being made to close or plug the narrowest part of the opening substantially as described.

3. The combination of a receptacle with a flexible washer or stopper having a funnel-shaped opening, and a handle or stem provided with a brush or spreader and made to close said opening, said washer having a portion of its face about the narrowest part of said opening sunk or receded substantially as described.

4. The combination of a receptacle with a flexible washer or stopper having a funnel-shaped opening, and a handle or stem provided with a brush or spreader and made to close said opening, said washer having a portion of its face about the narrowest part of said opening sunk or receded and inclined downwardly toward the opening substantially as described.

5. The combination of a receptacle with a flexible washer or stopper having a funnel-shaped opening, and a handle or stem provided with a brush or spreader, said handle or stem being made to close said opening, and said washer having its outer face inclined or tapered for insertion into a cap or holder substantially as described.

6. The combination of a receptacle with a flexible washer or stopper having a funnel-shaped opening, and a handle or stem provided with a brush or spreader, said handle or stem being made to close said opening, and said washer having its outer face inclined and its top provided with a flat rim or face for insertion into and engagement by a cap or holder substantially as described.

7. The combination with a bottle or receptacle, of a cap secured to the mouth of the bottle or receptacle, and a flexible washer constructed with a funnel-shaped opening and located within and inclosed by the said cap, substantially as and for the purpose described.

In testimony whereof I have hereunto set my hand in the presence of two subscribing witnesses.

ADOLPH BÜHLER.

Witnesses:
G. P. SCHMIDT,
MICH PUTZE.